(12) United States Patent
Spilman et al.

(10) Patent No.: US 10,196,484 B2
(45) Date of Patent: Feb. 5, 2019

(54) METHOD FOR PRODUCING POLYCARBAMATE, A POLYCARBAMATE PRODUCED THEREBY AND A COATING CONTAINING THE POLYCARBAMATE

(71) Applicant: Dow Global Technologies LLC, Midland, MI (US)

(72) Inventors: Gary E. Spilman, Midland, MI (US); Congcong Lu, Midland, MI (US); Daryoosh Beigzadeh, Jr., Midland, MI (US); Yiyong He, Midland, MI (US); Paul J. Popa, Auburn, MI (US); John N. Argyropoulos, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/916,555

(22) PCT Filed: Sep. 18, 2014

(86) PCT No.: PCT/US2014/056235
§ 371 (c)(1),
(2) Date: Mar. 3, 2016

(87) PCT Pub. No.: WO2015/042228
PCT Pub. Date: Mar. 26, 2015

(65) Prior Publication Data
US 2016/0215094 A1    Jul. 28, 2016

Related U.S. Application Data

(60) Provisional application No. 61/878,744, filed on Sep. 17, 2013.

(51) Int. Cl.
*C08G 18/62*  (2006.01)
*C08G 71/04*  (2006.01)
*C09D 175/06* (2006.01)
*C08F 8/30*   (2006.01)

(52) U.S. Cl.
CPC .......... *C08G 71/04* (2013.01); *C08G 18/6229* (2013.01); *C08G 18/6254* (2013.01); *C09D 175/06* (2013.01)

(58) Field of Classification Search
CPC ........................................ C08G 18/62
USPC ........................................... 528/256
See application file for complete search history.

(56) References Cited

U.S. PATENT DOCUMENTS

| 4,548,998 | A | 10/1985 | Chang et al. |
| 5,593,785 | A | 1/1997 | Mayo et al. |
| 5,646,214 | A | 7/1997 | Mayo |
| 6,111,001 | A | 8/2000 | Barancyk et al. |
| 6,825,286 | B2 | 11/2004 | Ohrbom et al. |
| 6,946,515 | B1 | 9/2005 | Lettmann et al. |
| 2005/0119422 | A1 | 6/2005 | Baumgart et al. |
| 2009/0044724 | A1 | 2/2009 | Ohrbom et al. |

OTHER PUBLICATIONS

PCT Search Report dated Jan. 16, 2015; from counterpart PCT Application No. PCT/US2014/056235.
PCT IPRP dated Mar. 22, 2016; from counterpart PCT Application No. PCT/US2014/056235.
EP Office Action dated Feb. 1, 2017; from EP counterpart Application No. 14780976.8.
EP Office Action dated Oct. 6, 2017; from EP counterpart Application No. 14780 976.8.
Chinese Office Action dated Sep. 13, 2018; from counterpart Chinese Application No. 201480049813.8.
Japanese Office Action dated Jun. 29, 2018; from Japanese counterpart Application No. 2016-542689.

*Primary Examiner* — Duc Truong

(57) ABSTRACT

A method for producing polycarbamate comprising: contacting at least one carbamylating agent with a polyol in the presence of a carbamylation catalyst to form a reaction mixture having an acid value from 3 to 50 mg KOH/g dry polyol is provided. Further provided are a polycarbamate produced by the method and a coating comprising the polycarbamate.

9 Claims, No Drawings

METHOD FOR PRODUCING POLYCARBAMATE, A POLYCARBAMATE PRODUCED THEREBY AND A COATING CONTAINING THE POLYCARBAMATE

FIELD OF INVENTION

The instant invention relates to a method for producing polycarbamate, a polycarbamate produced thereby and a coating containing the polycarbamate.

BACKGROUND OF THE INVENTION

Tin-based esterification catalysts have been reported as catalysts for the carbamylation of polyols with carbamylating agents to form polycarbamates. The tin-based catalyst is non-specific in its activity, promoting both esterification and carbamylation reactions. For acrylic polyols, therefore, there is a simultaneous tendency for molecular weight to increase via branching. This is an undesirable result which is attributed to a side reaction of hydroxyl groups with the ester groups of the acrylic polymer. Accordingly, a carbamylation process which results in lower unwanted bXy-product and which does not substantially increase the molecular weight and/or viscosity would be desirable.

SUMMARY OF THE INVENTION

The instant invention is a method for producing polycarbamate, a polycarbamate produced thereby and a coating containing the polycarbamate.

In one embodiment, the instant invention provides a method for producing polycarbamate comprising: contacting at least one carbamylating agent with a polyol in the presence of a carbamylation catalyst to form a reaction mixture having an acid value from 3 to 50 mg KOH/g dry polyol.

DETAILED DESCRIPTION OF THE INVENTION

The instant invention is a method for producing polycarbamate, a polycarbamate produced thereby and a coating containing the polycarbamate.

The method for producing polycarbamate comprising: contacting at least one carbamylating agent with a polyol in the presence of a carbamylation catalyst to form a reaction mixture having an acid value from 3 to 50 mg KOH/g dry polyol.

In another embodiment, the instant invention provides a polycarbamate produced according to any embodiment of the method disclosed herein.

In yet another embodiment, the instant invention provides a coating comprising the polycarbamate according to any embodiment disclosed herein.

In another embodiment, the instant invention further provides the method for producing polycarbamate, polycarbamate and coating, in accordance with any embodiment disclosed herein, wherein the polyol comprises units derived from one or more monomers having one or more acid functionalities and/or one or more functionalities which become acidic in the reaction mixture.

In an alternative embodiment, the instant invention further provides the method for producing polycarbamate, polycarbamate, and coating, in accordance with any embodiment disclosed herein, wherein the contacting is in the presence of an external component which comprises an acidic functionality and/or a functionality which becomes acidic in the reaction mixture.

Carbamylating Agent

Any carbamylating agent may be used. In one embodiment, the carbamylating agent is urea. In an alternative embodiment, the carbamylating agent is methyl carbamate, ethyl carbamate, a higher alkyl carbamate, alkenyl carbamate or an aromatic carbamate. The carbamylating agent may be present in the reaction in any form. For example, the carbamylating agent may be in solution, a melt, a clathrate, or a solid. In a particular embodiment, the carbamylating agent is provided as an aqueous solution of urea.

Polyol

As used herein, the term "polyol" means an organic molecule having at least 2 —OH functionalities. As used herein, the term "polyester polyol" means a subclass of polyol that is an organic molecule having at least 2 alcohol (—OH) groups and at least one carboxylic ester ($CO_2$—C) functionality. The term "alkyd" means a subclass of polyester polyol that is a fatty acid-modified polyester polyol wherein at least one carboxylic ester functionality is preferably derived from an esterification reaction between an alcoholic —OH of the polyol and a carboxyl of a ($C_8$-$C_{60}$) fatty acid. The polyol may be any polyol; for example, the polyol may be selected from the group consisting of acrylic, styrene-acrylic, styrene-butadiene, saturated polyester, polyalkylene polyols, urethane, alkyd, polyether or polycarbonate. In one exemplary embodiment, the polyol component comprises hydroxyethyl acrylate. In another exemplary embodiment, the polyol component comprises hydroxyethyl methacrylate.

The reaction mixture may comprise from 10 to 99 percent by weight of polyol; for example, from 30 to 70 percent by weight of polyol. In one embodiment, the polyol has a functional structure of a 1,2-diol, 1,3-diol, or combinations thereof.

The polyol can be non-cyclic, straight or branched; cyclic and nonaromatic; cyclic and aromatic, or a combination thereof. In some embodiments the polyol comprises one or more non-cyclic, straight or branched polyols. For example, the polyol may consist essentially of one or more non-cyclic, straight or branched polyols.

In one embodiment, the polyol consists essentially of carbon, hydrogen, and oxygen atoms. In another embodiment, the polyol consists of primary hydroxyl groups. In yet another embodiment, the hydroxyl groups are in the 1,2 and/or 1,3 configuration. Exemplary polyol structures are shown below for illustrative purposes.

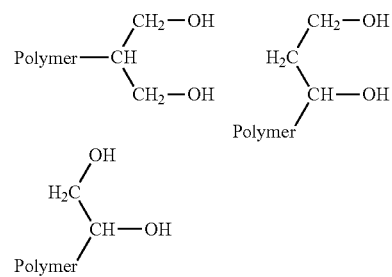

Polyol useful in embodiments of the inventive process include oligomers or polymers derived from hydroxy-containing acrylic monomeric units. Suitable monomers may be, but are not limited to, hydroxyethyl acrylate, hydroxypropyl acrylate, hydroxybutyl acrylate, hydroxydodecyl acrylate, hydroxyethyl methacrylate, hydroxypropyl methacrylate, hydroxybutyl methacrylate, hydroxydodecyl methacrylate, hydroxybutyl vinyl ether, diethylene glycol vinyl ether and any combinations thereof. The polyol useful in embodiments may be prepared by reacting at least one hydroxyl-containing monomer with one or more monomers. Suitable monomers may be, but are not limited to, vinyl monomers such as styrene, vinyl ether, such as ethyl vinyl ether, butyl vinyl ether, cyclohexyl vinyl ether, ester of unsaturated carboxylic acid and dicarboxylic acid, such as methyl acrylate, methyl methacrylate, ethyl acrylate, ethyl methacrylate, 2-ethylhexyl acrylate, 2-ethylhexyl methacrylate, dodecyl acrylate, dodecyl methacrylate, dimethyl maleate and a mixture thereof.

Polyols useful in certain embodiments of the inventive process include polyether polyols and polyester polyols. Suitable polyols for the preparation of polyester polyols include, for example, ethylene glycol, diethylene glycol, neopentyl glycol, 1,4-butanediol, 1,6-hexanediol, glycerol, pentaerythritol, sorbitol, mannitol, 1,3-propanediol, 2,4-dimethyl-2-ethylhexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,5-pentanediol, 2,2,4-tetramethyl-1,6-hexanediol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, erythritol, threitol, dipentaerythritol, dimethylolpropionic acid, and the like.

Suitable polycarboxylic acids for the preparation of polyester polyols useful in the invention may include, but are not limited to, phthalic anhydride or acid, maleic anhydride or acid, fumaric acid, isophthalic acid, succinic anhydride or acid, adipic acid, azelaic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride or acid, citric acid, pyromellitic dianhydride or acid, trimesic acid, sodium sulfoisophthalic acid, as well as from anhydrides of such acids, and esters thereof, where they exist. Optionally monocarboxylic acids may be employed including, but not limited to, benzoic acid. The reaction mixture for producing alkyds includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

In a particular embodiment, the polyol is an acrylic polyol comprising units derived from one or more monomers selected from the group consisting of 2-ethylhexyl acrylate, methyl methacrylate, and 2-hydroxyethyl methacrylate.

In an alternative embodiment, the polyol is an acrylic polyol comprising units derived from one or more acid functional monomers selected from the group consisting of acrylic acid, methacrylic acid, itaconic acid and maleic acid.

Acidic Condition

The method occurs under conditions giving rise to an acid value from 3 to 50 mg KOH/g dry polyol. All individual values and subranges from 3 to 50 mg KOH/g dry polyol are included herein and disclosed herein; for example, the acid value may range from a lower limit of 3, 13, 23, 33, or 43 mg KOH/g dry polyol to an upper limit of 10, 20, 30, 40 or 50 mg KOH/g dry polyol. For example, the acid value may be from 3 to 50 mg KOH/g dry polyol, or in the alternative, the acid value may be from 3 to 50 mg KOH/g dry polyol, or in the alternative, the acid value may be from 3 to 30 mg KOH/g dry polyol, or in the alternative, the acid value may be from 15 to 50 mg KOH/g dry polyol, or in the alternative, the acid value may be from 15 to 30 mg KOH/g dry polyol.

In one embodiment, the polyol comprises units derived from a monomer having one or more acid functionalities thereby giving rise, at least in part, to the acid value of the reaction mixture. Monomers having one or more acid functionalities include, for example, methacrylic acid, alkyl methacrylic acids, acrylic acid, and alkyl acrylic acids.

Alternatively, the polyol may comprise units derived from a monomer having a functionality which becomes acidic in the reaction mixture. For example, the polyol may comprise units derived from monomers having one or more anhydride functionalities which convert into acid functionalities when the carbamylating agent is present as an aqueous solution. Monomers having functionality(ies) which may convert into acid functionality in the reaction mixture include, for example, maleic anhydride and itaconic anhydride.

In an alternative embodiment, one or more external components are added to the reaction mixture to achieve an acid value from 3 to 50 mg KOH/g dry polyol. As used herein, the term external component means a component having one or more acid functionalities and/or one or more functionalities which become acidic in the reaction mixture. The external component is added in addition to the polyol, carbamylating agent and catalyst and does not refer to a polyol comprising units derived from one or more monomers having one or more acid functionalities. External acids include any acid, including organic and inorganic acids. In a particular embodiment, the external acid is benzoic acid.

Exemplary external acids include organic acids, for example, benzoic acid, nitrobenzoic acid, acetic acid, trichloroacetic acid, proponic acid, butyric acid, valeric acid, octanoic acid. Alternatively, external acids may include mineral acids, such as hydrochloric acid. In yet another alternative embodiment, the external acid is selecting from the group consisting of: (a) one or more organic acids; (b) one or more mineral acids; and (c) one or more organic acids in combination with one or more mineral acids.

In yet another embodiment, one or more compounds which may convert into acid in the reaction mixture may be added to the reaction mixture to achieve, at least in part, an acid value from 3 to 50 mg KOH/g reaction mixture. For example, one or more anhydrides may be added to the reaction mixture. The one or more anhydrides convert into acids in those instances, for example, wherein the carbamylating agent is present as an aqueous solution. Exemplary compounds which may convert into acid in the reaction mixture include acid anhydrides and acid halides.

The required acid value of the reaction mixture may be achieved by any combination of the foregoing.

Conversion

In one embodiment, at least 70 mol % of hydroxyl groups of the polyol are converted (i.e., the mole percent of OH groups reacted with the carbamylating agent to form polycarbamate or polyallophanate). All individual values and subranges from at least 70 mol % are included herein and disclosed herein. For example, the amount of hydroxyl groups of the polyol converted may be from a lower limit of 70 mol %, or in the alternative, the amount of hydroxyl groups of the polyol converted may be from a lower limit of 75 mol %, or in the alternative, the amount of hydroxyl groups of the polyol converted may be from a lower limit of 80 mol %, or in the alternative, the amount of hydroxyl groups of the polyol converted may be from a lower limit of 85 mol %, or in the alternative, the amount of hydroxyl groups of the polyol converted may be from a lower limit of 90 mol %.

Catalyst

Any carbamylation catalyst may be used. Suitable catalysts for use in this process include, but are not limited to, organo-tin compounds. The use of this type of catalyst is well known in the art. Examples of catalysts useful in the present invention include, but are not limited to, dibutyltin diacetate, and dibutyltin oxide. In a particular embodiment, the catalyst is used in an amount from 0.1% to 1.0 wt % based on polyol weight. All individual values and subranges from 0.1 to 1.0 wt % are included herein and disclosed herein; for example, the catalyst amount may range from a lower limit of 0.1, 0.2, 0.4, 0.6 or 0.8 wt % based on polyol weight to an upper limit of 0.15, 0.3, 0.5, 0.7, 0.9 or 1.0 wt % based on polyol weight. For example, the catalyst amount, in certain embodiments, may be from 0.1 to 1.0 wt % based on polyol weight, or in the alternative, from 0.5 to 1.0 wt % based on polyol weight, or in the alternative, from 0.1 to 0.6 wt % based on polyol weight.

In a particular embodiment, the carbamylation catalyst is dibutyltin oxide. In another embodiment, the carbamylation catalyst is butyltin oxide.

In an alternative embodiment, the instant invention further provides a polycarbamate produced according to any of the embodiments of the method disclosed herein. In a particular embodiment, the polycarbamate has a molecular weight, Mw, which is equal to or less than twice the Mw of the polyol. All individual values and subranges from equal to or less than twice the Mw of the polyol are included herein and disclosed herein. For example, the Mw of the polycarbamate may be equal to or less than twice the Mw of the polyol, or in the alternative, the Mw of the polycarbamate may be equal to or less than 1.8 times the Mw of the polyol, or in the alternative, the Mw of the polycarbamate may be equal to or less than 1.6 times the Mw of the polyol, or in the alternative, the Mw of the polycarbamate may be equal to or less than 1.4 times the Mw of the polyol.

In another embodiment, the polycarbamate has a polydispersity which is equal to or less than twice the polydispersity of the polyol. All individual values and subranges from equal to less than twice the polydispersity of the polyol are included herein and disclosed herein. For example, the polydispersity of the polycarbamate may be equal to less than twice the polydispersity of the polyol, or in the alternative, the polydispersity of the polycarbamate may be equal to less than 1.8 times the polydispersity of the polyol, or in the alternative, the polydispersity of the polycarbamate may be equal to less than 1.6 times the polydispersity of the polyol, or in the alternative, the polydispersity of the polycarbamate may be equal to less than 1.5 times the polydispersity of the polyol, or in the alternative, the polydispersity of the polycarbamate may be equal to less than 1.4 times the polydispersity of the polyol.

In yet another embodiment, the instant invention further provides a coating comprising a polycarbamate produced according to any embodiment of the method disclosed herein. Any coating end use application may be addressed using the polycarbamate produced according to the embodiments of the method disclosed herein. Exemplary coatings include, without limitation, those used in agricultural, construction, energy storage, electronics, communications, healthcare and medical, home, infrastructure, nutrition, oil and gas, packaging, personal care, clothing, transportation and water end use applications.

EXAMPLES

The following examples illustrate the present invention but are not intended to limit the scope of the invention.

Acrylic Polyol Synthesis and Incorporation of Acid in the Polymer Backbone

The acrylic polyols used in the Examples are synthesized through solution polymerization. Xylene was used as the synthesis solvent. Xylene was loaded into a reactor and heated to 140° C. reaction temperature. The monomers were then co-fed into the reactor along with initiator at fixed rates to start the polymerization. For Inventive Examples 1 and 2, acrylic acid was used as one of the monomers.

Carbamylation of Polyols

The carbamylation of polyols for all Examples were carried out at 140° C. reaction temperature. Catalyst (dibutyl tin oxide) was used at 0.6 wt % of the total weight of all reaction components. Urea was used as the carbamylating agent and was added in a semi-batch fashion in the reaction. For Inventive Examples 1, 3 and 4, the urea was prepared as an aqueous solution and fed into reactor at a fix rate over 6 hrs through a syringe pump. For Inventive Example 2, the urea was added as dry pellets to the reactor in a semi-batch manner at fixed time intervals for a total urea feed time of 6 hrs. For all Inventive Examples, 12-14 hrs of digestion time was continued after urea feeding was complete, making a total reaction time of 18~20 hr. For Inventive Examples 3 and 4, external acid was loaded into the reactor with polyol prior to the start of reaction. Tables 1-5 provide the components used in preparing the Comparative and Inventive Examples. 2-EHA indicates 2-ethylhexyl acrylate; MMA indicates methyl methacrylate; HEMA indicates hydroxyethyl methacrylate and AA indicates acrylic acid.

TABLE 1

| Comparative Example 1 | |
|---|---|
| Acrylic polyol (2-EHA/MMA/HEMA = 56 wt %/14 wt %/30 wt %) | 647.3 g |
| Xylene | 153.4 g |
| Urea solution (50 wt %) | 154.6 g |
| Dibutyl tin oxide | 5.33 g |
| Acid value (AV) of the dry polymer | NA |

TABLE 2

| Inventive Example 1 | |
|---|---|
| Acrylic polyol (2-EHA/MMA/HEMA/AA = 56 wt %/13 wt %/30 wt %/1 wt %) | 252.4 g |
| Xylene | 118.3 |
| Aqueous urea solution (50 wt %) | 58.7 g |
| Dibutyl tin oxide | 2.40 g |
| Measured AV of the dry AA-modified polymer | 9.8 |

TABLE 3

| Inventive Example 2 | |
|---|---|
| Acrylic polyol (2-EHA/MMA/HEMA/AA = 56 wt %/13 wt %/30 wt %/1 wt %) | 153.1 g |
| Xylene | 89.1 g |
| Urea pellets, dry solids | 17.8 g |
| Dibutyl tin oxide | 1.56 g |
| Measured AV of the dry AA-modified polymer | 9.8 |

TABLE 4

| Inventive Example 3 | |
|---|---|
| Acrylic polyol (2-EHA/MMA/HEMA = 56 wt %/14 wt %/30 wt %) | 580.6 g |
| Xylene | 235.1 g |
| Benzoic acid (BA) | 9.84 g |
| Urea solution (45 wt %) | 138.4 g |
| Dibutyl tin oxide | 5.31 g |
| Measured AV of the dry polymer plus external acid blend | 7.5 |

TABLE 5

| Inventive Example 4 | |
|---|---|
| Acrylic polyol (2-EHA/MMA/HEMA = 56 wt %/14 wt %/30 wt %) | 528.1 g |
| Xylene | 213.8 g |
| Benzoic acid | 17.9 g |

TABLE 5-continued

| Inventive Example 4 | |
|---|---|
| Urea solution (45 wt %) | 125.84 g |
| Dibutyl tin oxide | 4.83 g |
| Measured AV of the dry polymer plus external acid blend | 14.7 |

As shown in Table 6, Comparative Example 1, without any acid functionality present, exhibits significantly more 2-EHA and HEMA degradation than observed with the Inventive Examples.

Inventive Examples 1 and 2 illustrate that incorporation of even a low level of acid functionality into the polymer, the degradation of 2-EHA and HEMA are significantly reduced thereby reducing the levels of unwanted carbamate byproducts, namely, hydroxyethyl carbamate, ethylene dicarbamate and 2-ethylhexyl carbamate. This effect of acid incorporation in the polymer is seen for both aqueous urea solution and dry urea pellet routes.

Inventive Examples 3 and 4 likewise demonstrate reduction in 2-EHA and HEMA degradation and formation of carbamate byproducts. Inventive Example 4 demonstrates that acid can be used at a higher level to achieve better results in reducing the carbamate byproduct level, in comparison to the lower acid level used in Inventive Examples 1-3.

TABLE 6

| | 2-EHA and HEMA Degradation Byproducts | | | | | | |
|---|---|---|---|---|---|---|---|
| | Ethylene glycol | 2-Ethylhexanol | Hydroxyethyl carbamate | Ethylene Dicarbamate | 2-Ethylhexyl carbamate | Total 2-EHA degradation | Total HEMA Degradation |
| | (mol % byproducts, relative to their monomers) | | | | | | |
| Comp. Ex. 1 | 0.26% | 0.69% | 1.44% | 1.28% | 4.5% | 5.2% | 3.0% |
| Inv. Ex. 1 | 0.03% | 0.04% | 0.34% | 0.59% | 1.2% | 1.3% | 1.0% |
| Inv. Ex. 2 | 0.03% | 0.04% | 0.34% | 0.58% | 1.3% | 1.3% | 0.9% |
| Inv. Ex. 3 | 0.06% | 0.04% | 0.31% | 0.49% | 1.6% | 1.7% | 0.9% |
| Inv. Ex. 4 | 0.03% | 0.02% | 0.15% | 0.26% | 1.0% | 1.0% | 0.4% |

The main reaction, carbamylation of polyol, is measured by the conversion of hydroxyl. During carbamylation, other impurities are generated, such as biuret and cyanuric acid, in addition to the carbamate byproducts. Residual urea is also considered to be an impurity. Tables 7 and 8 show that the presence of acid functionality in the carbamylation reaction does not adversely impact OH conversion rate or other impurity levels at ~20 hr of total reaction time. Rather, the presence of the acid functionality in Inventive Examples 1-4 result in improved OH conversion and lower impurity production in comparison to Comparative Example 1.

TABLE 7

| | Reaction time (hr) | OH Conversion |
|---|---|---|
| Comp. Ex. 1 | 18.25 | 66.3% |
| Inv. Ex. 1 | 20 | 80.8% |
| Inv. Ex. 2 | 18 | 81.5% |
| Inv. Ex. 3 | 19 | 75.0% |
| Inv. Ex. 4 | 21 | 76.0% |

TABLE 8

| | Urea | Biuret | Cyanuric acid | 2-Ethylhexyl carbamate | Ethylene di-carbamate | Hydroxyethyl carbamate | 2-Ethyl hexanol | Ethylene glycol |
|---|---|---|---|---|---|---|---|---|
| Comp Ex. 1 | 0.35% | 0.15% | 0.00% | 1.95% | 0.36% | 0.29% | 0.22% | 0.03% |
| Inv. Ex. 1 | 0.31% | 0.16% | 0.02% | 0.59% | 0.17% | 0.07% | 0.02% | 0.00% |
| Inv. Ex. 2 | 0.07% | 0.07% | 0.03% | 0.62% | 0.17% | 0.07% | 0.02% | 0.00% |
| Inv. Ex. 3 | 0.45% | 0.16% | 0.02% | 0.78% | 0.14% | 0.06% | 0.02% | 0.01% |
| Inv. Ex. 4 | 0.28% | 0.14% | 0.02% | 0.46% | 0.08% | 0.03% | 0.01% | 0.00% |

Table 9 illustrates that in Comparative Example 1, weight average molecular weight of the product polycarbamate, Mw, gradually increases during the carbamylation reaction. Number average molecular weight, Mn, changes only slightly during the reaction, indicating that Mw is building up via branching among acrylic polyol side chains through a trans-esterification reaction. Thus, the catalyst used was not specific in its carbamylation activity. For Comparative Example 1, prior to carbamylation, the polydispersity (PD) of the polymer is 3.0, and the polydispersity increases to 15.5 after reaction, indicating severe branching, which results in significant viscosity increase that renders the material difficult to handle at a given VOC target.

TABLE 9

Comp. Ex. 1

| Reaction time | Mn | Mw | PD |
|---|---|---|---|
| t = 0 hr | 3300 | 9700 | 3.0 |
| t = 2.75 hr | 3500 | 15900 | 4.5 |
| t = 4.5 hr | 3200 | 17500 | 5.5 |
| t = 6.25 hr | 2800 | 21000 | 7.4 |
| t = 13.25 hr | 3500 | 33400 | 9.6 |
| t = 18.25 hr | 3500 | 54900 | 15.5 |

As shown in tables 10-13, the presence of acid functionality during carbamylation greatly suppresses the branching reaction, resulting in much lower Mw build-up. That the branching is suppressed is further shown by the insignificant change in the polydispersity before and after carbamylation for all of the Inventive Examples.

Tables 10-13 illustrate that the Mw buildup through trans-esterification of acrylic polyol side chains can be effectively controlled at acid functionality starting from an acid value of 7.5 mg KOH per gram of dry polymer plus external acid blend (Inv. Ex. 3). At increased acid functionality level in Inv. E. 4 (acid value of 14.7 mg KOH per gram of dry polymer plus external acid blend), no adverse effect is observed on molecular weight distribution and Mw buildup can still be controlled effectively. Results from tables 10-13 also show no differentiation between acid incorporation and external addition in terms of molecular weight control.

TABLE 10

Inv. Ex. 1

| Reaction time | Mn | Mw | PD |
|---|---|---|---|
| t = 0 hr | 2900 | 9600 | 3.3 |
| t = 1.25 hr | 2900 | 9800 | 3.4 |
| t = 3.25 hr | 2900 | 10500 | 3.7 |
| t = 8.75 hr | 2500 | 10800 | 4.3 |
| t = 11.75 hr | 2900 | 11400 | 3.9 |
| t = 19 hr | 2800 | 12700 | 4.5 |

TABLE 11

Inv. Ex. 2

| Reaction time | Mn | Mw | PD |
|---|---|---|---|
| t = 0 hr | 2900 | 9600 | 3.3 |
| t = 1 hr | 2900 | 10200 | 3.5 |
| t = 7 hr | 2900 | 11600 | 4.0 |
| t = 13 hr | 3000 | 12200 | 4.1 |
| t = 18 hr | 3000 | 13700 | 4.6 |

TABLE 12

Inv. Ex. 3

| Reaction time | Mn | Mw | PD |
|---|---|---|---|
| t = 0 hr | 3300 | 9700 | 3.0 |
| t = 2 hr | 3800 | 11000 | 2.9 |
| t = 4 hr | 3700 | 11600 | 3.12 |
| t = 6 hr | 3600 | 11800 | 3.2 |
| t = 9 hr | 3600 | 12600 | 3.5 |
| t = 12 hr | 3600 | 12800 | 3.5 |
| t = 16 hr | 3600 | 13600 | 3.8 |
| t = 19 hr | 4400 | 14400 | 3.3 |

TABLE 13

Inv. Ex. 4

| Reaction time | Mn | Mw | PD |
|---|---|---|---|
| t = 0 hr | 3300 | 9700 | 3.0 |
| t = 3 hr | 3600 | 11000 | 3.0 |
| t = 5 hr | 3800 | 11200 | 3.0 |
| t = 6 hr | 3900 | 11400 | 3.0 |
| t = 21 hr | 3900 | 12600 | 3.2 |

Test Methods

Test methods include the following:
$^{13}C$ NMR

All samples were characterized by $^{13}C$ NMR in solutions. For a typical sample preparation, 0.8 g sample was dissolved in 2.5 mL DMSO-$d_6$ solvent at room temperature in a glass vial. The DMSO-$d_6$ solvent contains 0.015 M Cr(acac)$_3$ as a relaxation agent. The solution was then transferred to a 10 mm NMR tube for characterization. Quantitative inverse-gated $^{13}C$ NMR experiments were performed on a Bruker Avance 400 MHz ($^1H$ frequency) NMR spectrometer equipped with a 10 mm DUAL C/H cryoprobe. All experiments were carried out without sample spinning at 25.0° C. Calibrated 90° pulse was applied in the inverse-gated pulse sequence. The relaxation delay between consecutive data acquisitions is $5*T_1$, where $T_1$ is the longest spin-lattice relaxation time of all nuclei in the measured system. The $^{13}C$ NMR spectra were processed with a line broadening of 1 Hz, and referenced to 39.5 ppm for the DMSO-$d_6$ resonance peak.

Information that can be obtained from $^{13}C$ NMR spectra includes the percent of hydroxyl conversion and byproduct levels in the reaction product. The carbon next to a hydroxyl group has a chemical shift change after the carbamylation reaction. The hydroxyl conversion was calculated from the peak intensity ratio of the carbon after and before a carbamylation reaction. In a quantitative $^{13}C$ NMR spectrum, each component of the measured system has a unique resonance peak, and its peak intensity is proportional to the molar concentration of that species. The byproduct levels were calculated by integrating the desired peaks. The molar concentration can be converted to weight percentage if the molecular weights for all species are known.

GPC

Molecular weight and polydispersity values were measured by gel permeation chromatography (GPC) on an Agilent 1260 Infinity series LC system equipped with an Agilent 1260 Infinity series refractive index detector. Samples were dissolved in HPCL grade THF at a concentration of approximately 10 mg/mL and filtered through at 0.45 µm syringe filter before injection through the two PLGel 300×7.5 mm Mixed B columns (5 mm, Agilent Technologies Inc.). A flow rate of 1 mL/min and temperature of 35° C. were maintained. The columns were calibrated with narrow molecular weight PS standards (Polystyrene High EasiVials, Agilent Technologies).

Acid Value Titration Method

Acid value of the polymer reaction sample (dried) was determined by titration with standardized KOH solution. 1-4 g of dry polymer sample or dried reaction mixture was dissolved in 25 ml 50/50 (v/v) isopropanol/xylene solution in an Erlenmeyer flask. The fully dissolved sample was then titrated to a phenolphthalein endpoint with 0.1M KOH solution. The AV of the sample was calculated by multiplying the ml of KOH used by 5.61 and dividing the result by the dry polymer or dried sample solution weight:

$$AV(\text{mg KOH/g sample}) = \text{ml}(0.1M \text{ KOH titrant}) \times 5.61/\text{g (sample)}$$

The present invention may be embodied in other forms without departing from the spirit and the essential attributes thereof, and, accordingly, reference should be made to the appended claims, rather than to the foregoing specification, as indicating the scope of the invention.

The invention claimed is:

1. A method for producing polycarbamate comprising: contacting urea with from 30 to 70% by weight of an acrylic polyol in the presence of a carbamylation catalyst and in the presence of one or more external components having one or more functionalities selected from the group consisting of acid functionalities and functionalities which become acidic in the reaction mixture to form a reaction mixture having an acid value from 15 to 50 mg KOH/g dry polyol, wherein said carbamylation catalyst is selected from dibutyltin oxide, butyltin oxide and dibutyltin diacetate thereby producing a polycarbamate, wherein the polycarbamate has a molecular weight, Mw, which is no higher than twice the Mw of the starting polyol.

2. The method according to claim 1, wherein the polyol comprises units derived from one or more monomers having one or more functionalities selected from the group consisting of acid functionalities and functionalities which become acidic in the reaction mixture.

3. The method according to claim 1, wherein the acrylic polyol comprises units derived from one or more monomers selected from the group consisting of 2-ethylhexyl acrylate, methyl methacrylate, and 2-hydroxyethyl methacrylate.

4. The method according to claim 1, wherein the carbamylation catalyst is dibutyltin oxide.

5. The method according to claim 1, wherein the urea is present as an aqueous solution of urea.

6. The method according to claim 1, wherein at least 70 mol % of hydroxyl groups of the polyol are converted.

7. The method according to claim 1, wherein the external component is benzoic acid.

8. A polycarbamate produced according to the method of claim 1, wherein the polycarbamate has a polydispersity which is no higher than twice the polydispersity of the starting polyol.

9. A coating comprising a polycarbamate produced according to the method of claim 1.

* * * * *